US011948532B2

(12) United States Patent
Pyun et al.

(10) Patent No.: US 11,948,532 B2
(45) **Date of Patent: *Apr. 2, 2024**

(54) DISPLAY DEVICE CAPABLE OF PERFORMING PEAK DRIVING IN DISPLAY AREA AND DRIVING METHOD THEREOF

(71) Applicant: Samsung Display Co., Ltd., Yongin-Si (KR)

(72) Inventors: Ki Hyun Pyun, Gwangmyeong-si (KR); Eun Jin Choi, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/978,057

(22) Filed: Oct. 31, 2022

(65) Prior Publication Data

US 2023/0052687 A1 Feb. 16, 2023

Related U.S. Application Data

(63) Continuation of application No. 17/133,207, filed on Dec. 23, 2020, now Pat. No. 11,488,562.

(30) Foreign Application Priority Data

May 11, 2020 (KR) ........................ 10-2020-0056116

(51) Int. Cl.
*G09G 5/10* (2006.01)
*G09G 3/20* (2006.01)

(52) U.S. Cl.
CPC ............. *G09G 5/10* (2013.01); *G09G 3/2007* (2013.01); *G09G 2320/0673* (2013.01)

(58) Field of Classification Search
CPC .................. G09G 5/10; G09G 3/2007; G09G 2320/0673; G09G 2330/021;
(Continued)

(56) References Cited

U.S. PATENT DOCUMENTS 10,152,924 B2 12/2018 Kim et al.
10,475,411 B2 11/2019 Kang et al.
(Continued)

FOREIGN PATENT DOCUMENTS

KR 10-1511130 B1 4/2015
KR 10-2016-0028591 A 3/2016
(Continued)

*Primary Examiner* — Rodney Amadiz
(74) *Attorney, Agent, or Firm* — Innovation Counsel LLP

(57) ABSTRACT

A display device comprises a display area including a plurality of pixels, a peak driving determination part determining peak driving based on an input image signal, a normal driving compensation part including a first luminance lookup table having a first luminance as a peak luminance, a peak driving compensation part including a second luminance lookup table having a second luminance higher than the first luminance as a peak luminance, a compensation adjusting part that generates a peak driving gamma curve by smoothing a first and second luminance gamma curves corresponding to the first and second luminance lookup tables and generates a peak driving lookup table according to the peak driving gamma curve, and a signal controller generating an image data signal by applying one normal driving lookup table to a portion of the display area and applying the peak driving lookup table to an other portion of the display area.

8 Claims, 10 Drawing Sheets

(58) Field of Classification Search
CPC ............. G09G 3/3208; G09G 2360/16; G09G 3/3275; G09G 2320/0233
See application file for complete search history.

(56) References Cited

U.S. PATENT DOCUMENTS

| | | | | |
|---|---|---|---|---|
| 10,770,023 | B2 | 9/2020 | Morein | |
| 10,957,236 | B2 | 3/2021 | Liao et al. | |
| 11,488,562 | B2 * | 11/2022 | Pyun | G09G 3/3208 |
| 2016/0351102 | A1 | 12/2016 | Shin et al. | |

FOREIGN PATENT DOCUMENTS

| | | | |
|---|---|---|---|
| KR | 10-1671514 | B1 | 11/2016 |
| KR | 10-1682531 | B1 | 12/2016 |
| KR | 10-1769120 | B1 | 8/2017 |
| KR | 10-1857627 | B1 | 6/2018 |

* cited by examiner

DISPLAY DEVICE CAPABLE OF PERFORMING PEAK DRIVING IN DISPLAY AREA AND DRIVING METHOD THEREOF

CROSS-REFERENCE TO RELATED APPLICATION

This application is a continuation application of U.S. patent application Ser. No. 17/133,207 filed on Dec. 23, 2020, which claims priority under 35 USC § 119 to Korean Patent Application No. 10-2020-0056116 filed in the Korean Intellectual Property Office on May 11, 2020, the disclosures of which are incorporated herein in their entirety by reference.

BACKGROUND

(a) Field

The present disclosure relates to a display device and a driving method thereof. More particularly, the present disclosure relates to a display device and a driving method thereof that may perform peak driving.

(b) Description of the Related Art

Recently, the importance of an organic light emitting diode (OLED) device has increased as a device for displaying various images.

The organic light emitting diode (OLED) device displays various images by using an organic light emitting diode (OLED) that generates light by recombination of electrons and holes. Since the organic light emitting diode device has a self-emission characteristic so that it does not require an additional light source such as a backlight, unlike a liquid crystal display (LCD) device, it is possible to reduce overall thickness and weight thereof. In addition, the organic light emitting diode (OLED) device has additional characteristics such as low power consumption, high luminance, and fast response time.

The above information disclosed in this Background section is only for enhancement of understanding of the background of the disclosure, and therefore it may contain information that does not form the prior art that is already known in this country to a person of ordinary skill in the art.

SUMMARY

A display device may calculate a screen load to reduce power consumption and adjust luminance of an entire screen according to the screen load. When the screen load is large, an image is displayed based on a general peak luminance, and when the screen load is small, the image is displayed based on a high peak luminance, and thus, the power consumption of the display device may be reduced. A peak luminance means a luminance of an image when the image is displayed at a maximum gray. Displaying an image based on a high peak luminance is referred to as peak driving, and displaying an image based on a general peak luminance that is lower than a peak luminance is referred to as normal driving.

The normal driving and the peak driving are applied to the entire screen. In this case, a luminance of a portion darkly displayed in the normal driving may increase in the peak driving. This is because, when the luminance of the darkly displayed portion increases in the peak driving, the effect of reducing power consumption is halved.

In addition, when a gamma of the display device is tuned based on the high peak luminance, the gamma of the display device may be lowered in the normal driving. Further, when the gamma of the display device is tuned based on the general peak luminance, a problem that some grays may not be expressed in the peak driving may occur.

The present disclosure has been made in an effort to provide a display device and a driving method thereof that may locally perform peak driving in a display area.

An embodiment of the present disclosure provides a display device including: a display area including a plurality of pixels; a peak driving determination part configured to determine peak driving based on an input image signal; a normal driving compensation part including a first luminance lookup table having a first luminance as a peak luminance; a peak driving compensation part including a second luminance lookup table having a second luminance higher than the first luminance as the peak luminance; a compensation adjusting part that generates a peak driving gamma curve by smoothing a first luminance gamma curve corresponding to the first luminance lookup table and a second luminance gamma curve corresponding to the second luminance lookup table and generates a peak driving lookup table according to the peak driving gamma curve; and a signal controller configured to generate an image data signal by applying a normal driving lookup table to one portion of the display area and applying the peak driving lookup table to an other portion of the display area.

The normal driving lookup table may be the first luminance lookup table.

A gamma value of the first luminance gamma curve is equal to a gamma value of the second luminance gamma curve.

The peak driving determination part may analyze a screen load from an input image signal, and may determine the peak driving when a size of the screen load is smaller than a size of a reference load, and the screen load is a ratio of a portion in which an image is displayed according to the input image signal to an entire screen.

The display device may further include a gray analyzing part configured to determine a peak driving reference gray based on the input image signal, wherein the compensation adjusting part may smooth the first luminance gamma curve and the second luminance gamma curve based on the peak driving reference gray to generate the peak driving gamma curve.

The gray analyzing part may calculate an average gray of an image from the input image signal, and may determine the average gray of the image as the peak driving reference gray.

The gray analyzing part may calculate a highest gray of an image from the input image signal, and may determine a gray that is lower by a predetermined level than the highest gray of the image as the peak driving reference gray.

The gray analyzing part may divide the display area into a plurality of blocks, may select one block in which the peak driving is performed among the plurality of blocks, and may transmit peak driving block information including information about the block in which the peak driving is performed to the signal controller, and the signal controller may apply the peak driving lookup table to an input image signal corresponding to the block in which peak driving is performed among the plurality of blocks according to the peak driving block information.

The gray analyzing part may compare an average gray of each of the plurality of blocks with the peak driving reference gray, and may select one block in which the average gray is greater than the peak driving reference gray as the block in which the peak driving is performed.

The gray analyzing part may select one block in which the peak driving is performed in a zone unit including blocks arranged in a first direction among the plurality of blocks.

Another embodiment of the present disclosure provides a driving method of a display device, including steps of: receiving an input image signal; determining peak driving based on the input image signal; generating a peak driving gamma curve by smoothing a first luminance gamma curve having a first luminance as a peak luminance and a second luminance gamma curve having a second luminance higher than the first luminance as a peak luminance; generating a peak driving lookup table according to the peak driving gamma curve; generating an image data signal by applying a normal driving lookup table to an input image signal corresponding to a portion of a display area and applying the peak driving lookup table to an input image signal corresponding to another portion of the display area; and displaying an image according to the image data signal.

The normal driving lookup table may include a value of the image data signal with respect to a gray according to the first luminance gamma curve.

A screen load may be analyzed from the input image signal, and the peak driving may be determined when a size of the screen load is smaller than a size of a reference load, and the screen load is a ratio of a portion in which an image is displayed according to the input image signal to an entire screen.

The display device may further include dividing the display area into a plurality of blocks, and selecting one block in which the peak driving is performed among the plurality of blocks, wherein the peak driving lookup table may be applied to the input image signal corresponding to the block in which the peak driving is performed.

Each of the plurality of blocks may include at least one pixel.

An average gray of each of the plurality of blocks may be compared with a peak driving reference gray, and one block in which the average gray is greater than the peak driving reference gray may be selected as the block in which the peak driving is performed.

A highest gray of each of the plurality of blocks may be compared with the peak driving reference gray, and one block in which the highest gray is greater than the peak driving reference gray may be selected as the block in which the peak driving is performed.

An average gray may be analyzed for each zone including some of the plurality of blocks, and one zone in which the average gray is greater than the peak driving reference gray may be selected as the zone in which the peak driving is performed.

The display area may be divided into a plurality of zones including blocks arranged in a first direction, the normal driving lookup table may be applied to the input image signal corresponding to some of the plurality of zones, and the peak driving lookup table may be applied to an input image signal corresponding to some other of the plurality of zones.

A gamma value of the first luminance gamma curve is equal to a gamma value of the second luminance gamma curve.

The display device may perform the peak driving in a portion of the display area and the normal driving in another portion thereof. Since the peak driving and the normal driving may be applied on one screen at the same time, it is possible to prevent luminance of a darkly displayed portion of an image from being increased by the peak driving.

DETAILED DESCRIPTION

Figure 1:
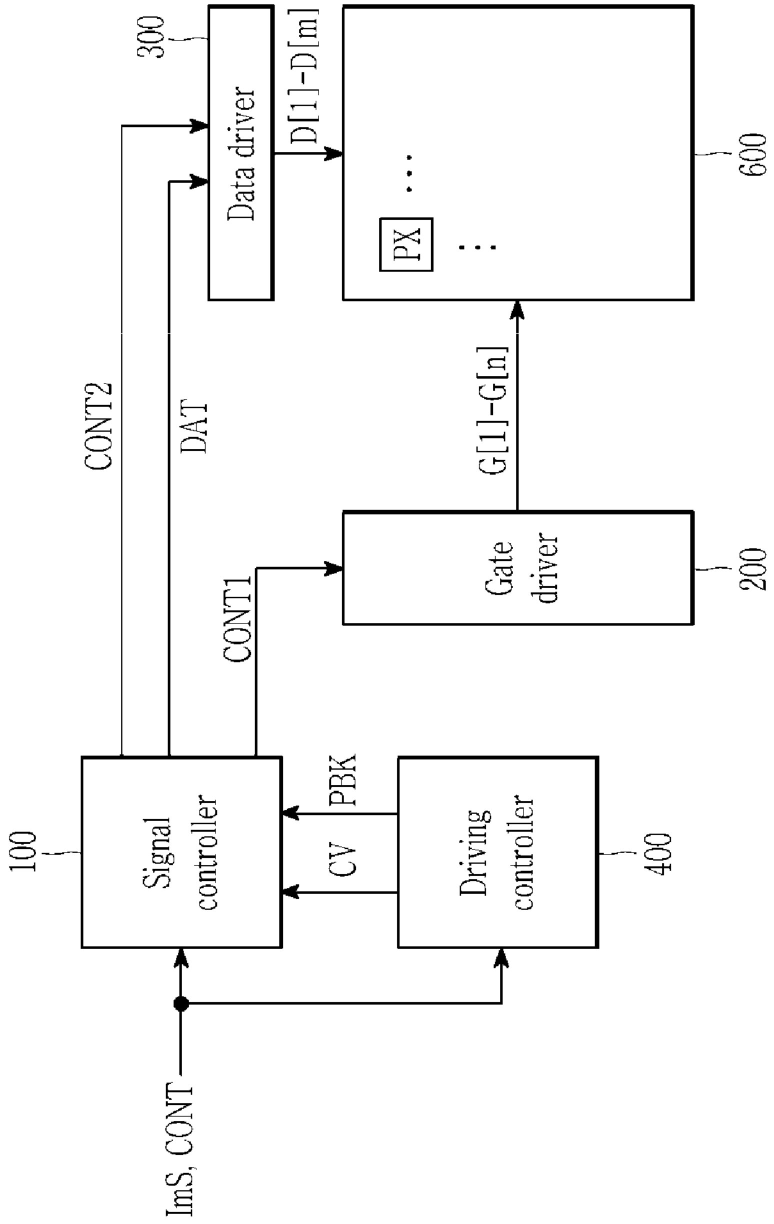
FIG. 1 illustrates a block diagram of a display device according to an embodiment of the present disclosure.

Embodiments of the present disclosure will be described more fully hereinafter with reference to the accompanying drawings, in which embodiments of the disclosure are shown. As those skilled in the art would realize, the described embodiments may be modified in various different ways, all without departing from the spirit or scope of the present disclosure.

Furthermore, with embodiments of the present disclosure, detailed description is made as to the elements in the first embodiment with reference to the relevant drawings by using the same reference numerals for the same elements, while only the elements different from those related to the first embodiment are described in other embodiments.

Parts that are irrelevant to the description will be omitted to clearly describe the present disclosure, and like reference numerals designate like elements throughout the specification.

Throughout the specification, unless explicitly described to the contrary, the word "comprise" and variations such as "comprises" or "comprising" will be understood to imply the inclusion of stated elements but not the exclusion of any other elements.

Hereinafter, a display device according to an embodiment of the present disclosure will be described with references to from FIGS. 1, 2, 3, 4, 5, 6, 7 8, and 9.

Figure 2:
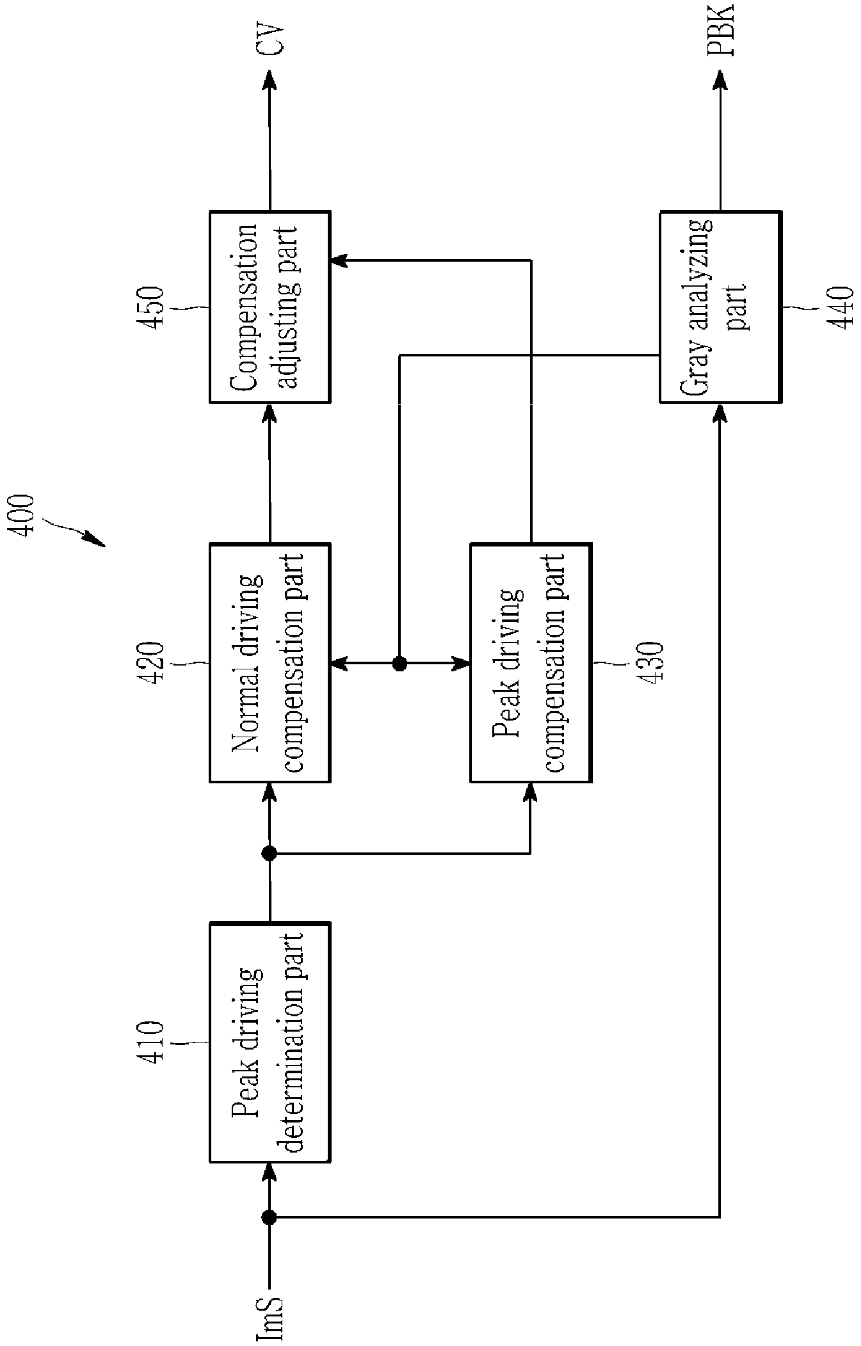
FIG. 2 illustrates a block diagram showing a driving controller according to an embodiment of the present disclosure.
Figure 3:
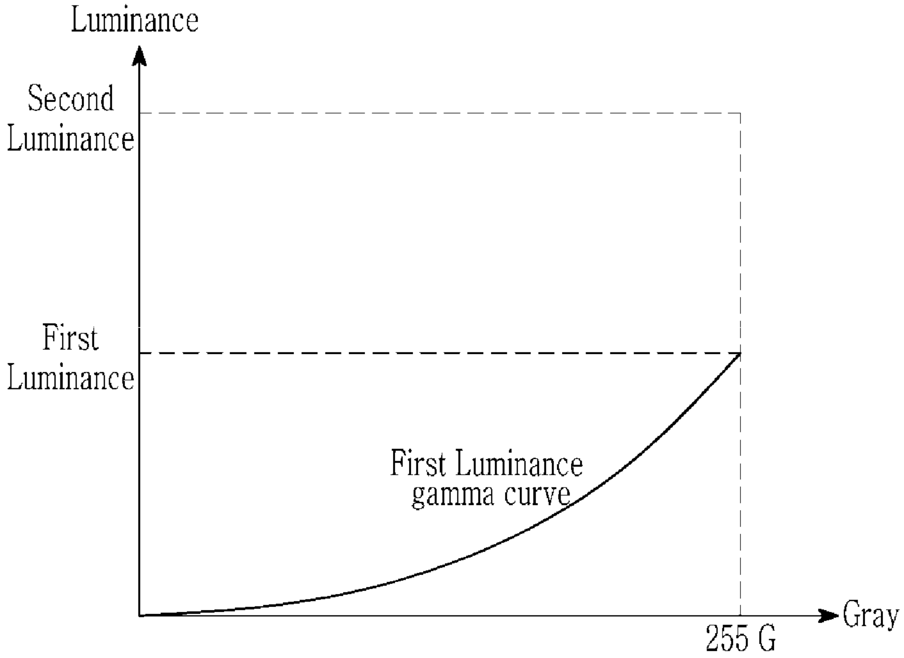
FIG. 3 illustrates a graph of a first luminance gamma curve according to an embodiment of the present disclosure.
Figure 4:
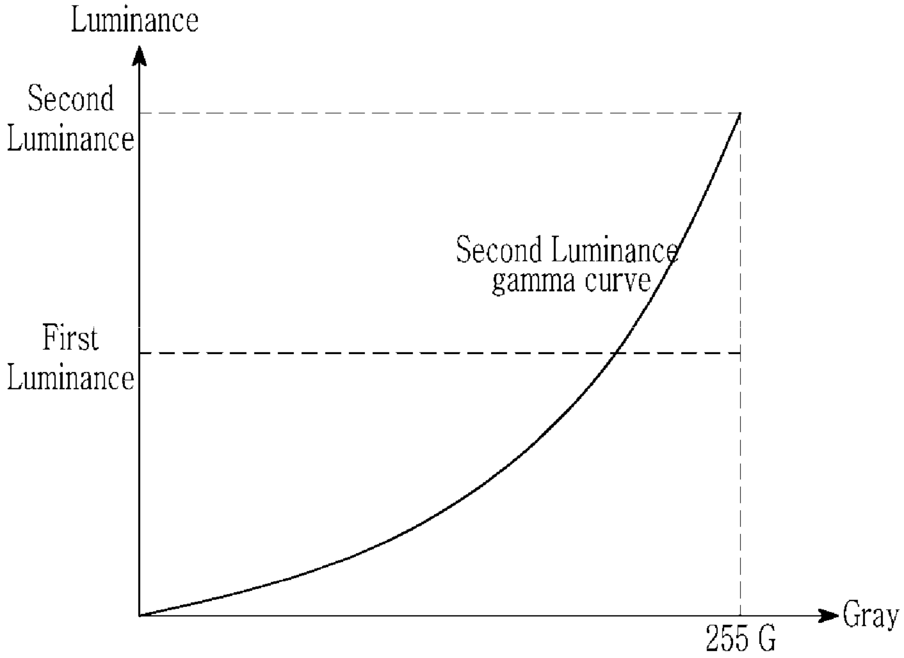
FIG. 4 illustrates a graph of a second luminance gamma curve according to an embodiment of the present disclosure.
Figure 5:
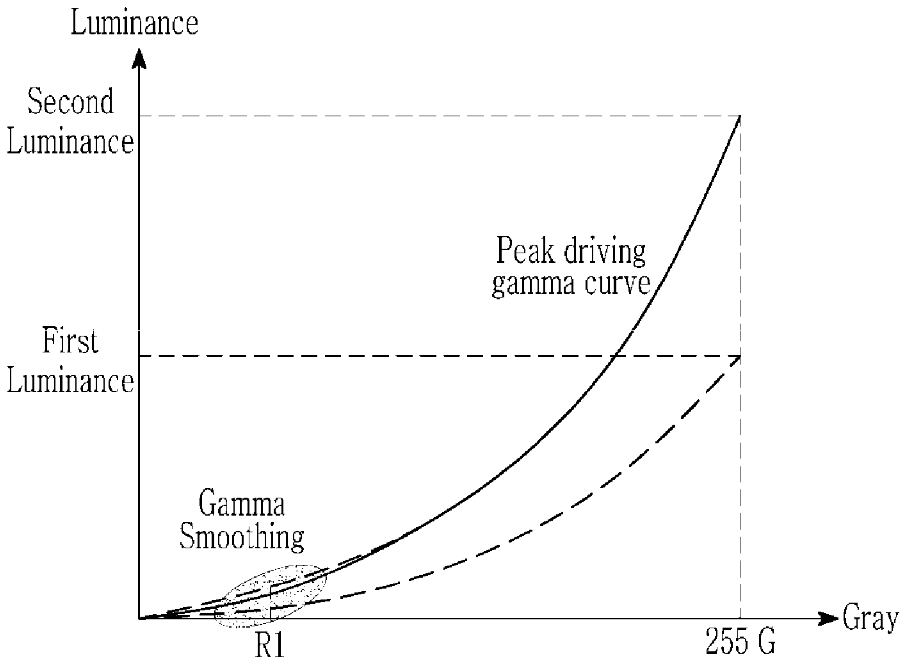
FIGS. 5, 6, and 7 illustrate graphs of a peak driving gamma curve according to an embodiment of the present disclosure.
Figure 6:
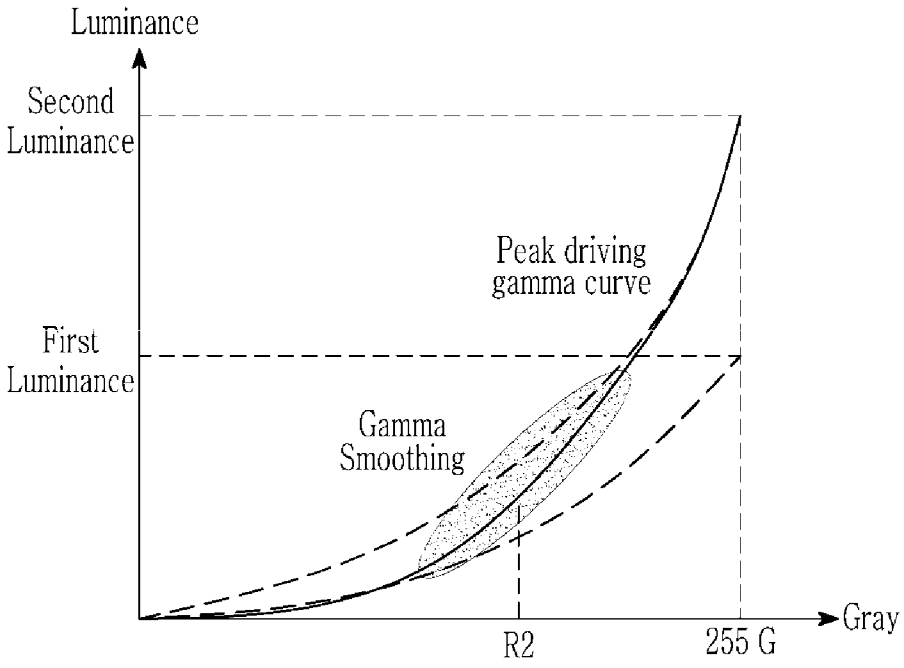
Figure 7:
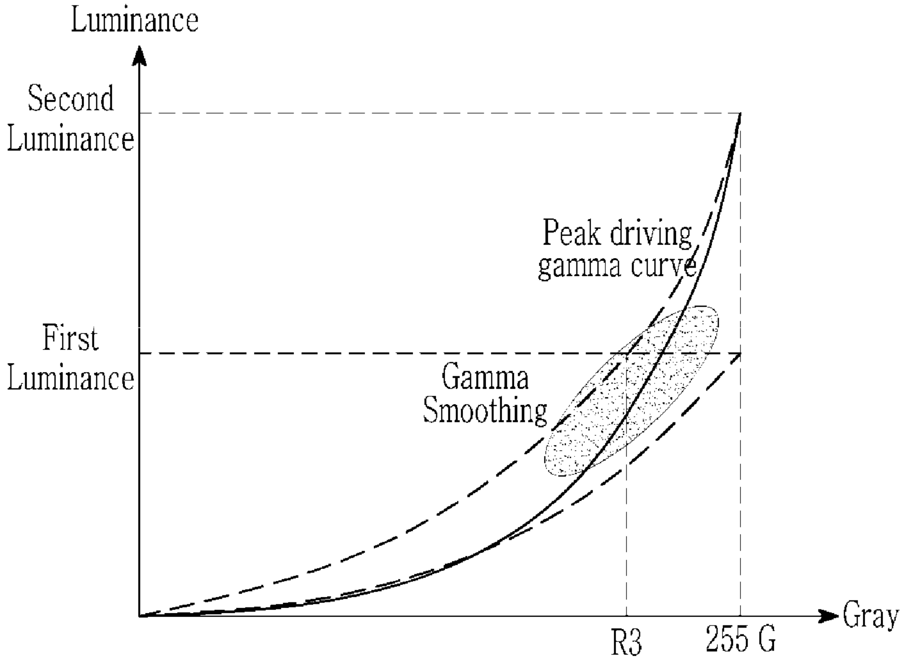
Figure 8:
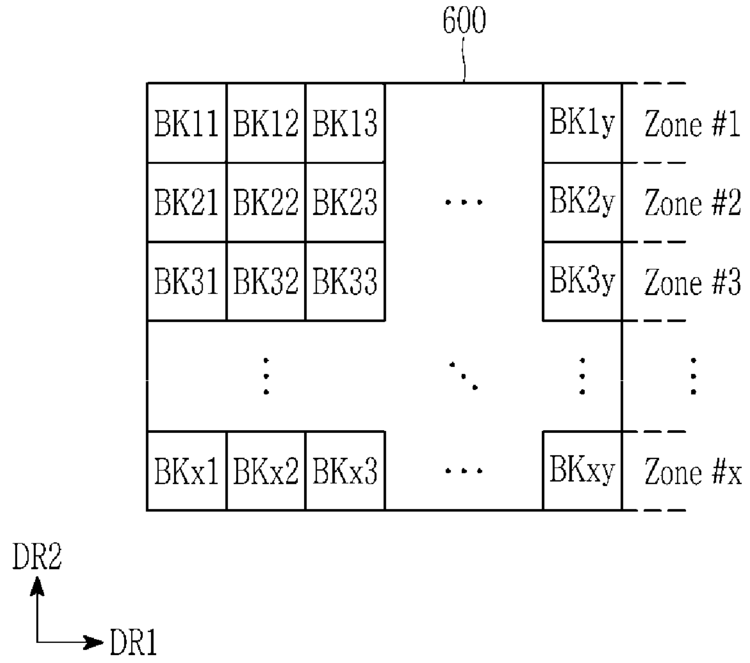
FIG. 8 illustrates a block diagram of a display area including an area in which peak driving may be locally performed according to an embodiment of the present disclosure.
Figure 9:
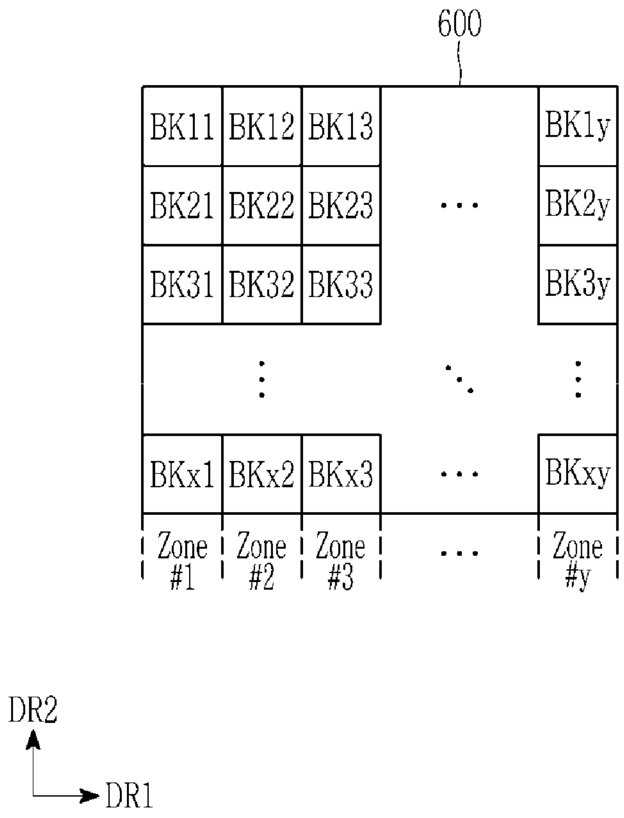
FIG. 9 illustrates a block diagram of a display area including an area in which peak driving may be locally performed according to another embodiment of the present disclosure.

FIG. 1 illustrates a block diagram of a display device according to an embodiment of the present disclosure. FIG. 2 illustrates a block diagram showing a driving controller according to an embodiment of the present disclosure. FIG. 3 illustrates a graph of a first luminance gamma curve according to an embodiment of the present disclosure. FIG. 4 illustrates a graph of a second luminance gamma curve according to an embodiment of the present disclosure. FIGS. 5, 6, and 7 illustrate graphs of a peak driving gamma curve according to an embodiment of the present disclosure. FIG. 8 illustrates a block diagram of a display area including an area in which peak driving may be locally performed according to an embodiment of the present disclosure. FIG. 9 illustrates a block diagram of a display area including an area in which peak driving may be locally performed according to another embodiment of the present disclosure.

Referring to FIGS. 1, 2, 3, 4, 5, 6, 7, 8, and 9, the display device includes a signal controller 100, a gate driver 200, a data driver 300, a driving controller 400, and a display part 600. Here, the driving controller 400 is illustrated as being provided separately from the signal controller 100, but the driving controller 400 may be included in the signal controller 100.

The signal controller 100 receives an input image signal ImS and a synchronization signal CONT inputted from an external device. The input image signal ImS includes luminance information of a plurality of pixels PX. Luminance has a predetermined number of gray levels. The synchronization signal CONT may include a horizontal synchronization signal, a vertical synchronization signal, and a main clock signal.

The signal controller 100 generates a first driving control signal CONT1, a second driving control signal CONT2, and an image data signal DAT according to the input image signal ImS and the synchronization signal CONT. The signal controller 100 may generate the image data signal DAT by classifying the input image signal ImS in units of frames according to the vertical synchronization signal and classifying the input image signal ImS in units of gate lines according to the horizontal synchronization signal.

The signal controller 100 receives a compensation value CV and peak driving block information PBK from the driving controller 400. The signal controller 100 may generate the image data signal DAT by applying the compensation value CV to the input image signal ImS. The signal controller 100 may adjust a level of the image data signal DAT according to the compensation value CV.

The signal controller 100 transmits the first driving control signal CONT1 to the gate driver 200. The signal controller 100 transmits the image data signal DAT and the second driving control signal CONT2 to the data driver 300.

The display part 600 includes the plurality of pixels PX to display an image. An area in which the plurality of pixels PX are arranged to display an image is called a display area or a screen. The display part 600 includes a plurality of signal lines connected to the plurality of pixels PX. The plurality of signal lines includes a plurality of scan lines and a plurality of data lines. The plurality of scan lines may substantially extend in a row direction so that they are substantially parallel to each other. The plurality of data lines may substantially extend in a column direction so that they are substantially parallel to each other. The plurality of pixels PX may be arranged in an area in which the plurality of scan lines and the plurality of data lines intersect. The signal line included in the display part 600 may be variously changed according to a structure of the plurality of pixels PX included in the display part 600.

The gate driver 200 is connected to a plurality of gate lines. The gate driver 200 generates a plurality of gate signals from G[1] to G[n] according to the first driving control signal CONT1. The plurality of gate signals from G[1] to G[n] consist of a combination of a gate-on voltage and a gate-off voltage. The gate driver 200 may sequentially apply the gate signals from G[1] to G[n] of the gate-on voltage to the plurality of gate lines.

The data driver 300 is connected to a plurality of data lines. The data driver 300 samples and holds the image data signal DAT according to the second driving control signal CONT2, and applies data voltages from D[1] to D[m] to the plurality of data lines. The data driver 300 applies the data voltages from D[1] to D[m] having a predetermined voltage range to the plurality of data lines in response to the gate signals from G[1] to G[n] of the gate-on voltage.

The driving controller 400 receives the input image signal ImS. The driving controller 400 provides the compensation value CV and the peak driving block information PBK to the signal controller 100 so that local peak driving may be performed according to the input image signal ImS. The peak driving block information PBK includes information about a block or region to perform peak driving. The signal controller 100 may generate the image data signal DAT by applying a compensation value CV to some blocks based on the peak driving block information PBK, and accordingly, the local peak driving may be performed.

The local peak driving is a driving method of displaying an image based on a first luminance in a portion of the display area and displaying an image based on a second luminance higher than the first luminance in another portion of the display area. The first luminance may be a peak luminance of normal driving, and the second luminance may be a peak luminance of peak driving.

As depicted in FIG. 2, the driving controller 400 may include a peak driving determination part 410, a normal driving compensation part 420, a peak driving compensation part 430, a gray analyzing part 440, and a compensation adjusting part 450.

The peak driving determination part 410 receives the input image signal ImS from an external input source. The peak driving determination part 410 analyzes a screen load from the input image signal ImS. The screen load may be a ratio of a portion in which an image is displayed according to the input image signal ImS, to an entire screen. The peak driving determination part 410 may determine the normal driving when the size of the screen load is greater than or equal to that of a reference load, and may determine the peak driving when the size of the screen load is smaller than that of the reference load. The reference load may be a preset value. For example, the reference load may be set to 20%, and the peak driving may be determined when a portion displayed with a gray of greater than 0 gray is less than 20% in the entire screen.

The peak driving determination part 410 transmits a peak driving enable signal to the normal driving compensation part 420 and the peak driving compensation part 430 when the peak driving is determined.

The normal driving compensation part 420 may include a first luminance lookup table having the first luminance as the peak luminance. For example, the first luminance may be 1000 nit. The first luminance lookup table may include a luminance value with respect to the gray according to the first luminance gamma curve illustrated in FIG. 3. Alternatively, the first luminance lookup table may include a value of the image data signal DAT with respect to the gray according to the first luminance gamma curve. When receiving the peak driving enable signal, the normal driving compensation part 420 may transmit the first luminance lookup table to the compensation adjusting part 450.

The peak driving compensation part 430 may include a second luminance lookup table having the second luminance as the peak luminance. For example, the second luminance may be 2000 nit. The second luminance lookup table may include a luminance value with respect to the gray according to the second luminance gamma curve illustrated in FIG. 4. Alternatively, the second luminance lookup table may include a value of the image data signal DAT with respect to the gray according to the second luminance gamma curve. When receiving the peak driving enable signal, the peak driving compensation part 430 may transmit the second luminance lookup table to the compensation adjusting part 450.

A gamma value of the first luminance gamma curve and a gamma value of the second luminance gamma curve may be the same. For example, both the gamma value of the first luminance gamma curve and the gamma value of the second luminance gamma curve may be equal to 2.2.

The gray analyzing part 440 receives the input image signal ImS. A peak driving reference gray (for example, R1 of FIG. 5, R2 of FIG. 6, and R3 of FIG. 7) may be determined based on the input image signal ImS. The peak driving reference gray may be a standard for applying either the normal driving or the peak driving.

For example, the gray analyzing part 440 may calculate an average gray of an image displayed on the display area from the input image signal ImS. The gray analyzing part 440 may determine the average gray of the image as the peak driving reference gray. Alternatively, the gray analyzing part 440 may calculate a highest gray of the image displayed on the display area, and determine a gray as low as a predetermined level compared with the highest gray as the peak driving reference gray.

Alternatively, the gray analyzing part 440 may have one or more predetermined peak driving reference grays, and among the predetermined peak driving reference grays, a peak driving reference gray having a lower value than that of the average gray or the highest gray of the image displayed in the display area may be determined. For example, when the display device may display 0 to 255 grays, the gray analyzing part 440 may determine the first reference gray R1 (for example, a gray of 32), which is a low gray, as the peak driving reference gray. Alternatively, the gray analyzing part 440 may determine the second reference gray R2 (for example, a gray of 128), which is an intermediate gray, as the peak driving reference gray. Alternatively, the gray analyzing part 440 may determine the third reference gray R3 (for example, a gray of 192), which is a high gray, as the peak driving reference gray.

The gray analyzing part 440 may simultaneously transmit the peak driving reference gray to the normal driving compensation part 420 and the peak driving compensation part 430. The normal driving compensation part 420 may transmit all of the first luminance lookup table to the compensation adjusting part 450, or may transmit only a value of the image data signal DAT for a gray equal to or less than the peak driving reference gray in the first luminance lookup table according to the peak driving reference gray to the compensation adjusting part 450. The peak driving compensation part 430 may transmit all of the second luminance lookup table to the compensation adjusting part 450, or may transmit only a value of the image data signal DAT for a gray of greater than the peak driving reference gray in the second luminance lookup table according to the peak driving reference gray to the compensation adjusting part 450.

The compensation adjusting part 450 generates a peak driving lookup table based on the first luminance lookup table and the second luminance lookup table. The compensation adjusting part 450 may generate peak driving gamma curves as shown in FIGS. 5, 6, and 7 by smoothing the first luminance gamma curve of FIG. 3 and the second luminance gamma curve of FIG. 4. The smoothing is to alleviate localized abrupt changes to variables distributed on a plane, and may smooth a curve curvature. When the first luminance gamma curve and the second luminance gamma curve are smoothed, one continuous peak driving gamma curve may be generated as shown in FIGS. 5, 6, and 7. A smoothing method includes a moving average method, an exponential smoothing method, and the like, but is not limited thereto.

The compensation adjusting part 450 may generate a peak driving gamma curve by smoothing the first luminance gamma curve and the second luminance gamma curve based on the peak driving reference gray. That is, the peak driving gamma curve generated by the compensation adjusting part 450 may vary according to a value of the peak driving reference gray determined by the gray analyzing part 440. When the peak driving reference gray is the first reference gray R1, the gamma curve is smoothed near the first reference gray R1 as illustrated in FIG. 5, and thus, the peak driving gamma curve may be generated. When the peak driving reference gray is the second reference gray R2, the gamma curve is smoothed near the second reference gray R2 as illustrated in FIG. 6, and thus, the peak driving gamma curve may be generated. When the peak driving reference gray is the third reference gray R3, the gamma curve is smoothed near the third reference gray R3 as illustrated in FIG. 7, and thus, the peak driving gamma curve may be generated.

As referring back to FIG. 2, the compensation adjusting part 450 may generate a peak driving lookup table according to the peak driving gamma curve. The peak driving lookup table may include compensation values CV with respect to grays. The compensation adjusting part 450 transmits the compensation value CV according to the peak driving lookup table to the signal controller 100.

The gray analyzing part 440 may divide the display area into a plurality of blocks (for example, BK11-BK1 *y*, BK21-BK2 *y*, BK31-BK3 *y*, . . . , BKx1, BKxy in FIG. 8 and FIG. 9), and may analyze an average gray or highest gray of each of the plurality of blocks based on the input image signal ImS. Each of the plurality of blocks may include at least one pixel. The gray analyzing part 440 may select a block in which the peak driving is performed from among the plurality of blocks based on the average gray or highest gray of each of the plurality of blocks. The gray analyzing part 440 may compare the average gray of each of the plurality of blocks with the peak driving reference gray thereof, and then may select a block in which the average gray is greater than the peak driving reference gray thereof as a block in which the peak driving is performed. Alternatively, the gray analyzing part 440 may compare the highest gray of each of the plurality of blocks with the peak driving reference gray thereof, and then may select a block in which the highest gray is greater than the peak driving reference gray thereof as a block in which the peak driving is performed. The gray analyzing part 440 transmits the peak driving block information PBK including information on the block in which the peak driving is performed to the signal controller 100.

As illustrated in FIG. 8 and FIG. 9, the display part 600 may include a plurality of blocks (BK11-BK1*y*, BK21-BK2*y*, BK31-BK3*y*, . . . , BKx1, and BKxy). The plurality of blocks (BK11-BK1*y*, BK21-BK2*y*, BK31-BK3*y*, . . . , BKx1, and BKxy) may be arranged to have a matrix form with the number of y in a first direction DR1 and the number of x in a second direction DR2. The gray analyzing part 440 may select a block in which the peak driving is performed among the plurality of blocks (BK11-BK1*y*, BK21-BK2*y*, BK31-BK3*y*, . . . , BKx1, and BKxy). The first direction DR1 may be a row direction, and the second direction DR2 may be a column direction.

The signal controller 100 generates the image data signal DAT by applying the compensation value CV according to the peak driving lookup table to the input image signal ImS corresponding to a block in which the peak driving is performed among the plurality of blocks (BK11-BK1*y*, BK21-BK2*y*, BK31-BK3*y*, . . . , BKx1, and BKxy) according to the peak driving block information PBK. In addition, the signal controller 100 may generate the image data signal DAT without applying the compensation value CV to the input image signal ImS corresponding to a block in which the peak driving is not performed. The image data signal DAT to which the compensation value CV is not applied may be generated according to the first luminance lookup table. The first luminance lookup table may be stored in the signal controller 100 as the normal driving lookup table.

As described above, an image is displayed according to the image data signal DAT generated by the normal driving lookup table being applied to some of the plurality of blocks (BK11-BK1*y*, BK21-BK2*y*, BK31-BK3*y*, . . . , BKx1, and BKxy), and an image is displayed according to the image data signal DAT generated by the peak driving lookup table being applied to the other some thereof, thus the local peak driving may be performed.

Meanwhile, the gray analyzing part 440 may analyze the average gray or highest gray for each zone that includes some of the plurality of blocks. As illustrated in FIG. 8, the display part 600 may be divided into a plurality of zones (Zone #1, Zone #2, Zone #3, . . . , Zone #x) including blocks arranged in the first direction DR1. In addition, as illustrated in FIG. 9, the display part 600 may be divided into a plurality of zones (Zone #1, Zone #2, Zone #3, . . . , Zone #y) including blocks arranged in the second direction DR2.

The gray analyzing part 440 may compare an average gray of each of the plurality of zones (Zone #1, Zone #2, Zone #3, . . . , Zone #x or Zone #1, Zone #2, Zone #3, . . . , Zone #y) with a peak driving reference gray thereof, and select a zone of which the average gray is greater than the peak driving reference gray thereof as a zone in which the peak driving is performed. Alternatively, the gray analyzing part 440 may compare the highest gray of each of the plurality of zones (Zone #1, Zone #2, Zone #3, . . . , Zone #x or Zone #1, Zone #2, Zone #3, . . . , Zone #y) with the peak driving reference gray thereof, and select a zone of which the highest gray is greater than the peak driving reference gray thereof as a zone in which the peak driving is performed. The gray analyzing part 440 may transmit the peak driving block information PBK including information on the zone in which the peak driving is performed to the signal controller 100. Accordingly, the lookup table for normal driving or peak driving may be applied to each zone (Zone #1, Zone #2, Zone #3, . . . , Zone #x or Zone #1, Zone #2, Zone #3, . . . , Zone #y) such that the image data signal DAT may be generated, thus the local peak driving may be performed.

Hereinafter, a driving method of the display device will be described with reference to FIG. 10 together with FIGS. 1, 2, 3, 4, 5, 6, 7, 8, and 9.

Figure 10:
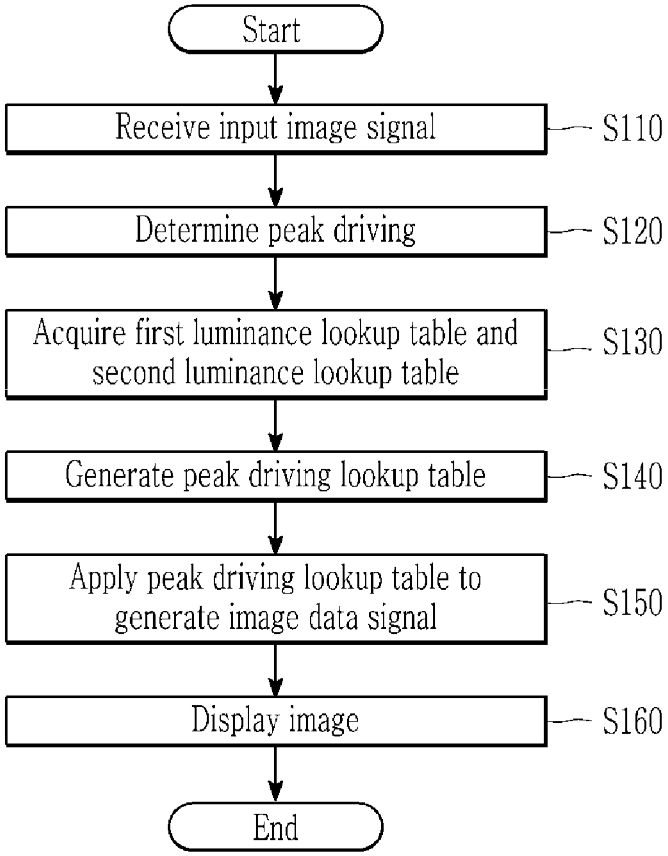
FIG. 10 illustrates a flowchart of a driving method of a display device according to an embodiment of the present disclosure.

FIG. 10 illustrates a flowchart of a driving method of a display device according to an embodiment of the present disclosure.

Referring to FIG. 10, the display device receives the input image signal ImS (S110). The input image signal ImS includes luminance information of the plurality of pixels PX.

The display device determines the peak driving based on the input image signal ImS (S120). The display device may analyze the screen load from the input image signal ImS, and determine the peak driving when the size of the screen load is smaller than that of the reference load. The screen load may be a ratio of a portion in which an image is displayed according to the input image signal ImS, to an entire screen. The display device may determine the normal driving when the size of the screen load is greater than or equal to that of the reference load.

The display device acquires the first luminance lookup table and the second luminance lookup table (S130). The first luminance lookup table may include a value of luminance with respect to a gray according to the first luminance gamma curve with the first luminance as the peak luminance. Alternatively, the first luminance lookup table may include a value of the image data signal DAT with respect to the gray according to the first luminance gamma curve. The second luminance lookup table may include a value of luminance with respect to the gray according to the second luminance gamma curve with the second luminance as the peak luminance. Alternatively, the second luminance lookup table may include a value of the image data signal DAT with respect to the gray according to the second luminance gamma curve.

The display device generates the peak driving lookup table based on the first luminance lookup table and the second luminance lookup table (S140). The display device may generate the peak driving gamma curve by smoothing the first luminance gamma curve and the second luminance gamma curve. The display device may generate the peak driving lookup table according to the peak driving gamma curve. The peak driving lookup table may include compensation values CV with respect to grays. Alternatively, the peak driving lookup table may include a value of the image data signal DAT with respect to the gray.

The display device generates the image data signal DAT by applying the peak driving lookup table to the input image signal ImS (S150). The normal driving lookup table is applied to the input image signal ImS corresponding to a portion of the display area, and the peak driving lookup table is applied to the input image signal ImS corresponding to another portion of the display area, thus the image data signal DAT may be generated. The normal driving lookup table may be the first luminance lookup table.

The display device generates the data voltages from D[1] to D[m] according to the image data signal DAT, and applies the data voltages from D[1] to D[m] to the plurality of pixels PX to display an image (S160). That is, an image is displayed according to the image data signal DAT generated by the normal driving lookup table being applied to a portion of the display area, and an image is displayed according to the image data signal DAT generated by the peak driving lookup table being applied to another portion thereof, thus the local peak driving may be performed.

While this disclosure has been described in connection with what is presently considered to be practical embodiments, it is to be understood that the disclosure is not limited to the disclosed embodiments, but, on the contrary, is intended to cover various modifications and equivalent arrangements included within the spirit and scope of the appended claims. Therefore, those skilled in the art will understand that various modifications and other equivalent embodiments of the present disclosure are possible. Consequently, the true technical protective scope of the present disclosure must be determined based on the technical spirit of the appended claims.

What is claimed is:

1. A display device comprising:

a display area including a plurality of pixels;

a peak driving determination part receiving an input image signal from an external source, determining a peak driving based on the input image signal, and outputting a peak driving enable signal;

a normal driving compensation part receiving the peak driving enable signal, the normal driving compensation part including a first luminance lookup table having a first luminance as a peak luminance;

a peak driving compensation part including a second luminance lookup table having a second luminance higher than the first luminance as the peak luminance;

a compensation adjusting part generating a peak driving gamma curve by smoothing a first luminance gamma curve corresponding to the first luminance lookup table and a second luminance gamma curve corresponding to the second luminance lookup table and generating a peak driving lookup table according to the peak driving gamma curve;

a signal controller receiving the input image signal and a synchronization signal from the external source to generate an image data signal by applying a normal driving lookup table for one portion of the display area and applying the peak driving lookup table for another portion of the display area; and a gray analyzing part receiving the input image signal from the external source to determine a peak driving reference gray based on the input image signal and simultaneously transmitting the peak driving reference gray to the normal driving compensation part and the peak driving compensation part, wherein the gray analyzing part calculates an average gray of an image from the input image signal, and determines the average gray of the image as the peak driving reference gray.

2. The display device of claim 1, wherein the normal driving lookup table is the first luminance lookup table.

3. The display device of claim 1, wherein a gamma value of the first luminance gamma curve is equal to a gamma value of the second luminance gamma curve.

4. The display device of claim 1, wherein the compensation adjusting part smooths the first luminance gamma curve and the second luminance gamma curve based on the peak driving reference gray to generate the peak driving gamma curve.

5. The display device of claim 4, wherein the gray analyzing part divides the display area into a plurality of blocks, selects one block in which the peak driving is performed among the plurality of blocks, and transmits peak driving block information including information about the block in which the peak driving is performed to the signal controller, and the signal controller applies the peak driving lookup table to an input image signal corresponding to the block in which the peak driving is performed among the plurality of blocks according to the peak driving block information.

6. The display device of claim 5, wherein the gray analyzing part compares an average gray of each of the plurality of blocks with the peak driving reference gray, and selects one block in which the average gray is greater than the peak driving reference gray as the block in which the peak driving is performed.

7. The display device of claim 5, wherein the gray analyzing part selects one block in which the peak driving is performed in a zone unit including blocks arranged in a first direction among the plurality of blocks.

8. The display device of claim 1, wherein the peak driving determination part analyzes a screen load from the input image signal, and determines the peak driving when a size of the screen load is smaller than a size of a reference load, and the screen load is a ratio of a portion in which an image is displayed according to the input image signal to an entire screen.

* * * * *